US010489803B2

(12) United States Patent
Johnson et al.

(10) Patent No.: US 10,489,803 B2
(45) Date of Patent: Nov. 26, 2019

(54) SYSTEMS AND METHODS OF ENABLING FORECASTING

(71) Applicant: Walmart Apollo, LLC, Bentonville, AR (US)

(72) Inventors: Christopher M. Johnson, Bella Vista, AR (US); Ting Li, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 293 days.

(21) Appl. No.: 15/411,521

(22) Filed: Jan. 20, 2017

(65) Prior Publication Data

US 2017/0213227 A1 Jul. 27, 2017

Related U.S. Application Data

(60) Provisional application No. 62/281,863, filed on Jan. 22, 2016.

(51) Int. Cl.
*G06Q 30/02* (2012.01)
*G06Q 10/06* (2012.01)

(52) U.S. Cl.
CPC ....... *G06Q 30/0202* (2013.01); *G06Q 10/067* (2013.01); *G06Q 10/0637* (2013.01); *G06Q 30/0201* (2013.01); *G06Q 30/0205* (2013.01)

(58) Field of Classification Search
None
See application file for complete search history.

(56) References Cited

U.S. PATENT DOCUMENTS 8,543,702 B1 * 9/2013 Marshall ............. H04L 67/2885
709/226
8,626,791 B1 * 1/2014 Lin ........................ G06N 20/00
707/778

(Continued)

OTHER PUBLICATIONS

Johnson, R., Harizopoulos, S., Hardavellas, N., Sabirli, K., Pandis, I., Ailamaki, A., . . . & Falsafi, B. (Sep. 2007). To share or not to share?. In Proceedings of the 33rd international conference on Very large data bases (pp. 351-362). VLDB Endowment. (Year: 2007).*

*Primary Examiner* — Stephanie Z Delich
*Assistant Examiner* — Matheus Stivaletti
(74) *Attorney, Agent, or Firm* — Fitch, Even, Tabin & Flannery LLP

(57) ABSTRACT

In some embodiments, apparatuses and methods are provided to enable wide access to numerous different previously compiled forecast modeling. In some embodiments, a system is provided that enables wide access to forecasting, comprising: a forecast model database that maintains numerous different forecast models that when run produce resulting forecast data relevant to making business decisions; and a forecasting interface system configured to receive multiple different forecast requests for forecast request data, which comprises a forecast model index comprising identifiers of the numerous different predefined forecast models and for each of the numerous different forecast models relevance characteristics, wherein the forecasting interface system selects, for each received forecast request, a forecast model of the numerous different forecast models based on a relationship between the corresponding forecast request data and the relevance characteristics.

14 Claims, 4 Drawing Sheets

(56) References Cited

U.S. PATENT DOCUMENTS

2003/0212618 A1\* 11/2003 Keyes .................... G06Q 30/02
                                                        705/35
2009/0018996 A1\* 1/2009 Hunt ...................... G06Q 30/02
2015/0339572 A1\* 11/2015 Achin ..................... G06N 5/02
                                                        706/46

\* cited by examiner

SYSTEMS AND METHODS OF ENABLING FORECASTING

CROSS-REFERENCE TO RELATED APPLICATION

This application claims the benefit of U.S. Provisional Application No. 62/281,863, filed Jan. 22, 2016, which is incorporated herein by reference in its entirety.

TECHNICAL FIELD

This invention relates generally to enabling access to forecast data and forecast models.

BACKGROUND

In a modern retail industry and other industries, there is a need to forecast conditions, results, factors and the like in making business decisions. Such forecasting often takes into consideration large number of variables and large ranges of inputs to those variables.

Further, such forecasting often takes months if not years to obtain effective and relatively accurate forecasts. Getting accurate forecasts can significantly affect costs and reduce revenue.

BRIEF DESCRIPTION OF THE DRAWINGS

Disclosed herein are embodiments of systems, apparatuses, methods and processes pertaining enabling wide access to forecasting. This description includes drawings, wherein.

Figure 1:
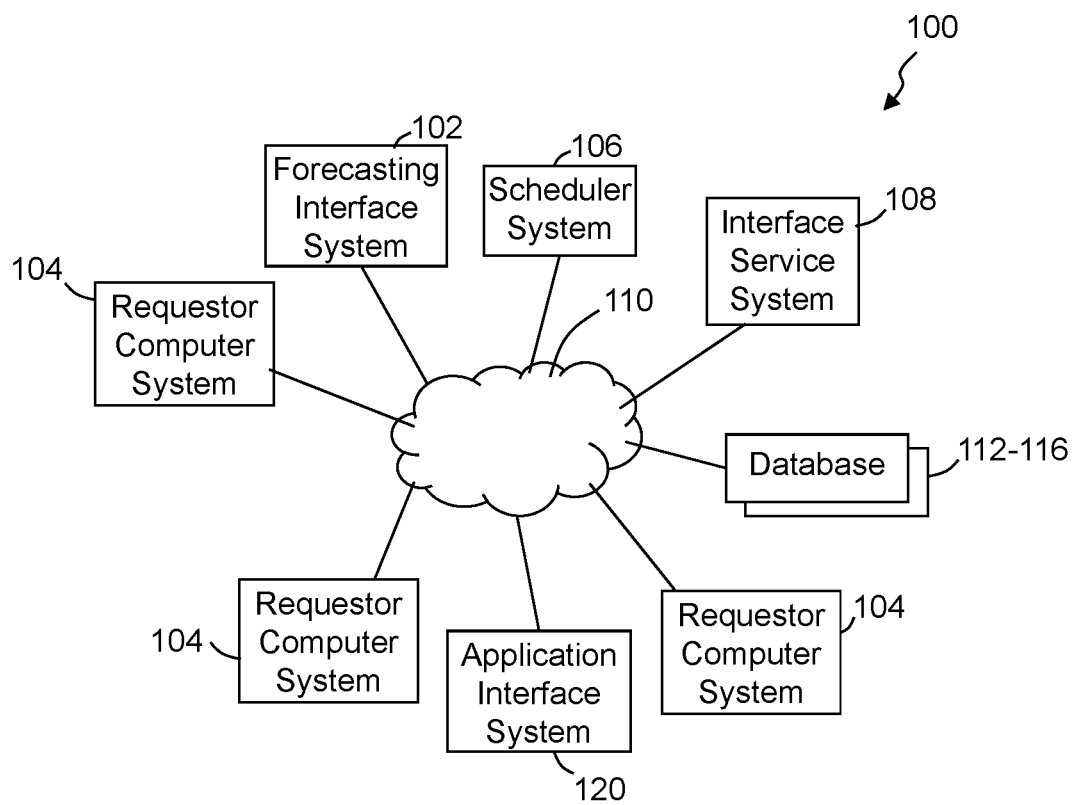
FIG. 1 illustrates a simplified block diagram of an exemplary forecasting system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provided herein to provide an interface that enables wide access to forecasting and to submit requests to run one or more forecast models from a database of numerous preconfigured and stored forecast models. This allows quick turnaround for results. Typically, a request for a forecast is submitted and the forecast model has to be developed, including developing the relevant algorithms to apply, identifying the types of input data to be considered, and then generate code into an executable to be implemented. Such modeling often took months if not more than a year to develop. Present embodiments, however, enable wide access to forecasting and/or models in retail, shipping, distribution, customer satisfaction, marketing, efficiency, financial evaluations, financial transactions, spatial organization, real estate, maintaining margins, linear regression, time series models, multivariate regression, neural networks, naïve bays, geospatial predictive modeling, and other such areas, forecasting and/or modeling.

In some embodiments, forecasting systems include a forecast model database that maintains numerous different forecast models that when each is run produce corresponding resulting forecast data. The resulting forecasting data is often relevant to making business decisions, such as in operating one or more retail shopping facilities, scheduling manufacturing and/or shipping, marketing efforts, financial allocations, and other such business decisions. The systems further include a forecasting interface system communicatively coupled with the forecast model database and configured to receive, over a distributed communication network from a plurality of different and geographically distributed requestor computer systems, multiple different forecast requests for forecast request data. The forecasting interface system can include and/or accesses a forecast model index that includes identifiers of the numerous different predefined forecast models, and for each of the numerous different forecast models relevance characteristics. The relevant characteristics provide characteristics that define the relevance of a corresponding forecast model and correspond to and/or are associated with one or more potential forecast request data. These characteristics can be substantially any relevant characteristic, such as shopping facility size or size range, quantity of products offered for sale by a shopping facility, historic sales quantities and/or thresholds, numbers of facilities, location, region, country, sales rates, type or types of products, specific product or products, department of a business or retail facility, stock on-hand quantities and/or thresholds, distances of shipments, quantities to be shipped, type of transportation(s) of a shipment, occupancy thresholds, customer quantities, average and/or mean thresholds, costs ranges, taxes, number of participants, other such characteristics, and typically a combination of such characteristics. The forecasting interface system is configured to select, for each received forecast request, one or more forecast models of the numerous different forecast models based on a relationship between the corresponding forecast request data and the relevance characteristics.

FIG. 1 illustrates a simplified block diagram of an exemplary forecasting system 100, in accordance with some embodiments. The forecasting system includes a forecasting interface system 102 that is communicatively coupled over a distributed communication network 110 with multiple different and geographically distributed requestor computer systems 104 that are utilized by different requestors to submit forecast requests and access corresponding resulting forecast data generated based on the forecasting interface system causing one or more forecast models to be run. The system further includes multiple databases 112-116 that are accessible by at least the forecasting interface system through direct coupling and/or over one or more communication networks 110 (e.g., LAN, WAN, Internet, etc.). The databases include a forecast model database 112 that stores and maintains forecast models that are utilized by the forecasting interface system 102. A forecast results database 113 is typically further maintained and stores and when relevant updates resulting forecast data. The forecast results database may further include status information corresponding one or more of the resulting forecast data. One or more of the databases may be implemented through one or more memory systems that may be distributed over the communication network, and may duplicate some or all of the information, models and the like one or more times.

In some embodiments, the forecasting system 100 further includes a scheduler system 106, an interface service system 108, and/or an application interface system 120. The scheduler system in coupled with the forecasting interface system and maintains a schedule of when one or more forecast models are to be run. In some applications, the scheduler system may further track resulting forecast data for one or more forecast models relative to one or more expiration threshold. The interface service system 108 in part enables a distribution of relevant information to be displayed and/or stored at requestor computer systems. Further, in some embodiments, one or more components of the forecasting system, such as the forecasting interface system, application interface system, scheduler system and the like may be implemented through multiple devices distributed over the communication network that cooperatively and/or duplicatively operate to provide the wide access to forecasting. For example, at least the forecasting interface system 102 may be implemented through one or more computers and/or servers distributed over and are accessible by the requestor computer systems via the communication network.

Figure 2:
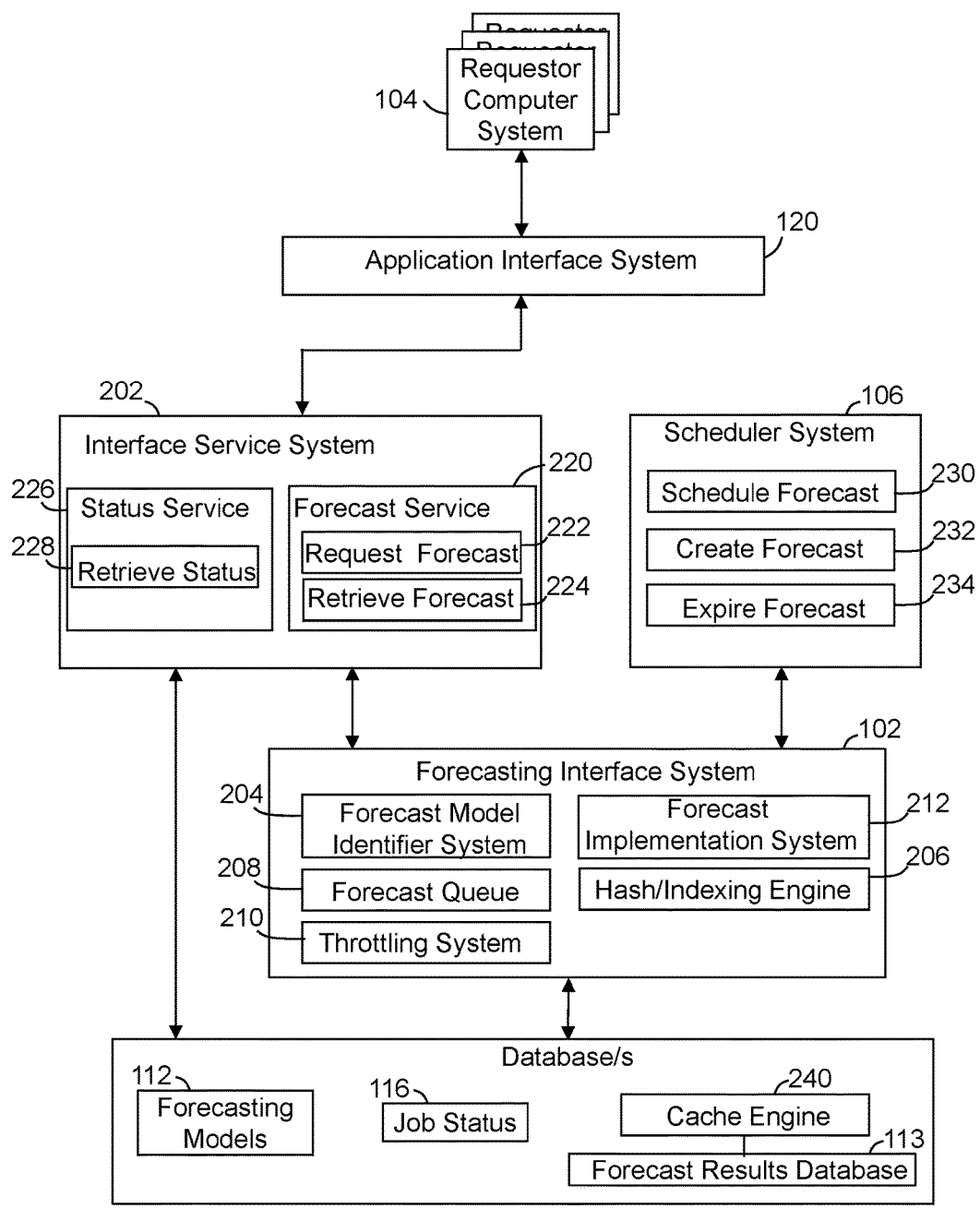
FIG. 2 illustrates a simplified component block diagram of at least some of the components of the exemplary forecasting system of FIG. 1, in accordance with some embodiments.

FIG. 2 illustrates a simplified component block diagram of at least some of the components of the exemplary forecasting system 100, in accordance with some embodiments. The forecasting system includes the forecasting interface system 102, the forecast model database 112, the forecast results database 113, the scheduler system 106, and the application interface system 120. In some embodiments, the forecasting system further includes an interface service system 202. The application interface system 120 establishes communication links, provides the communication protocol and/or formats communications over the distributed communication network with the request computer systems 104. In some embodiments, the application interface system couples with the distributed communication network 110 and is configured to distribute user interface data to each of the multiple requestor computer systems 104.

The user interface data causes the multiple requestor computer systems to display a user interface that enables the remote requestors to enter defined types of the forecast request data. Typically, the user interface data causes one or more graphical user interfaces to be displayed, each with one or more predefined form fields, options, pull-down options, and the like to receive forecast request data. The requestor can enter different forecast request data in specifying the type of forecasting being requested. For example, a requestor may be interested in obtaining a forecast for best products of dry grocery products to be featured, offered at a sales price, and/or highlighted in a particular department of a retail facility over a defined period of time (e.g., a one week period starting one day from the request date). The user interface data allows the requestor to specify, for example, start and end dates, one or more retail facility identifiers, requestor identifier, a department, types of products, specific products, limitations, and/or other such data. In some implementations, the application interface system establishes a platform to obtain forecast request data in a fixed format that can then be configured according to the relevant forecast model applied in generating the forecast results data.

In some implementations, the user interface data is organized in one or more hierarchies that help requests to identify the relevant one or more graphical user interfaces that are more relevant to the request being submitted. For example, a graphical user interface may specify different categories of forecasting, with sub-graphical user interfaces and/or subsequent graphical user interfaces including sub-categories relevant to one or more the corresponding categories. The application interface system may provide any number of levels of sub-categories to further organize the request parameters and focus the requestors forecast request.

Similarly, the application interface system provides a single source that requestors can use to get access to numerous different forecast models, and to submit such forecast requests. The application interface system can further provide a single source to access the resulting forecast data in a consistent format that is readily accessible from substantially any requestor computer system 104 without the requestor having to know what forecast model is run, where data is to be accessed to run the forecast, or where the forecast model stores the resulting forecast data. Further, some embodiments provide the forecast results in a consistent format that aids the requestors in interpreting the results and using the resulting forecast data in making one or more business decisions. The application interface system 120 is further configured to return the forecast request data to relevant components of the forecast system. In some applications, the application interface system utilizes information about a requestor computer system and corresponding formatting, and formats the resulting forecasting data consistent with the requestor computer system and/or corresponding communication protocols utilized by the requestor computer system.

The interface service system 202, in some applications, interfaces with the application interface system 120 and at least receives the forecast request data, and in some instances generates a request identifier that is specific to the forecast request. Further, in some implementations the interface service system extracts the relevant forecast request data. For example, the interface service system can include a forecast service application 220 that implements a request forecast application 222 to obtain and communicate relevant forecast request data and a corresponding request identifier to the forecasting interface system 102 to the forecasting interface system 102.

Similarly, the interface service system 202 can issue a notification that resulting forecast data is available and/or communicates the resulting forecasting data to the application interface system 120 to be formatted and communicated to the relevant requestor computer system. For example, the forecast service application may include a retrieve forecast application 224 that obtains and communicates the forecast results. In some embodiments, the application interface system further communicates requests from requestors to access results of a forecast request, and determines a request identifier and initiates the retrieval of requesting forecast data from the forecasting interface system and/or forecast results database 113. A status service application 226 may further be included that can receive and/or communicate status information regarding one or more requested forecasts. A retrieve status application 228 may receive or determine a forecast request identifier (e.g., "job ID") and upon receiving status information communicate the status information along with a corresponding forecast request identifier. Some embodiments maintain forecast request status information in one or more job status arrays, indexes, databases 116, or the like that is accessible to the interface service system 202. Information in the job status index and/or database can include forecast request identifiers and corresponding status information (e.g., queued, running, finished, error, etc.).

In some implementations, the forecasting interface system includes and/or is in communication with a forecast model identifier system 204 that evaluates the forecast request data and/or additional data for each forecast request to identify one or more forecast models that are to be run to satisfy each forecast request. The identification is determined based on an evaluation of a forecast request data and in some instances additional forecast request data that may be obtained and/or determined based on the forecast request data, the requestor, and/or other such information. In some instances, the requestor may specify a specific forecast model requested (e.g., based on a dropdown list made available to the requestor through a graphical user interface, based on knowledge from a previous request, or the like). In other instances, the requestors may navigate through the graphical user interfaces and/or the identification of categories can limit the potential the forecast models that are relevant to a request. Similarly, other predefined forecast request data is used to determine which one or more forecast models are to be activated. In some instances, the forecast model identifier communicates with an indexing engine 206 and provides relevant information (e.g., forecast request data, other data associated with forecast request data, etc.) that is used to sort one or more forecast model indexes and/or matrices that associate one or more of individual forecast request data with each forecast model. Based on the numbers of correlations between the forecast request data and the different previously compiled and available forecast models, the model identifier system and/or indexing engine select one or more forecast models that are determined to provide the forecasting information being sought by the requestor.

In some applications, a forecast model database may store multiple different versions of a forecast model. Each version is intended to generate similar resulting forecast data while being more relevant to variations on similar forecast request data. The forecast model identifier system further enables the fine-tuning of the resulting forecast data by selecting between different versions of a forecast model. For example, a first version of a forecast model may be more relevant to a retail facility that has a relatively large sales history data (e.g., more than five years), a second version that is more relevant to a retail facility that has limited sales history data (e.g. between two-five years), while a third version of the forecast model is more relevant to a retail facility having a small amount of sales history data (e.g., less than two years of sales history data). As another example, an updated beta version, which may not be fully tested and/or confirmed, of an existing forecast model may be available for some requestors (e.g., requestors authorized to utilize this beta version for further testing, evaluation, the requestor understands the results are from a beta version, or the like), while not available to other requestors. Other forecast models may have different versions that are used depending on other variations of the forecast request data and/or additional forecast request data that may be determined based on one or more parameters of the forecast request data provided. These variations can include for example, but not limited to, a number of products offered for sale at a retail facility, a number of employees, average number of employees working during a shift, quantities of product to be shipped, number of financial transactions, number and/or amount of financial investments, geographic size of a facility, variations in distances to be shipped, geographic location of a facility, number of participants, number of competitors within a geographic area, average overhead, number of vehicles in a fleet, number of available vehicles, types of vehicles, cost or wage of one or more workers, a statistical parameter corresponding to cost wage of a worker (e.g. average, median, mean, etc.), other such additional forecast request data, or combination of two or more of such additional forecast request data. The forecast model identifier system can utilize some or all of the forecast request data, additional forecast request data and/or other relevant data in selecting one or more forecast models and/or a specific version of a forecast model to be run in obtaining the forecast results requested by the requestor.

Often some of the forecast request data is not expressly supplied by the request, and instead the forecasting system 100 can retrieve and/or identify the additional forecast request data based on the forecast request data provided by the requestor. For example, additional forecast request data may be retrieved from one or more databases 114-115 based on one or more company identifier, identifier of a particular retail shopping facility, department identifier, requestor identifier, requestor computer system identifier, address information, product identifier, manufacturer identifier, shipping source location, shipping destination location, fund or other investment identifier, other such data or combination of two or more of such data provided by the requestor.

Accordingly, the forecasting interface system in selecting one or more forecast models may further retrieve additional forecast request data based on one or more parameters (e.g., an identifier of a retail shopping facility) received as at least part of the forecast request data, and selects between different valid and active versions of the selected retail forecast model based on the relevance characteristics corresponding to each of the different versions of the selected retail forecast model and the corresponding forecast request data and the additional forecast request data. At least some of the relevance characteristics correspond to forecast request data and/or additional forecast request data determined based on forecast request data. Accordingly, in some applications the forecasting interface system in retrieving the additional forecast request data may further retrieve historical sales volume data, relative facility size corresponding to the identifier of the retail shopping facility, other such data or combination of two or more of such data.

The indexing engine 206, in some applications, maintains a matrix, array and/or listing of predefined, developed and available forecast models that are accessible through the forecast model database 112. These predefined models typically have previously been developed, compiled, tested and verified, and are ready for use in generating forecast results. The indexing engine 206 associates different relevance characteristics associated with the different forecast models and/or potential forecasting request data characteristics that correspond to each model in determining when a forecast model should be used for one or more types of forecast requests.

Some embodiments further cache resulting forecast data in the forecast results database 113 to be stored for subsequent access in the event that another requestor submits a request for the same or a similar forecast request. A caching engine 240 is typically associated with the forecast results database to implement the caching into the database, and may provide information to the indexing engine used in populating the one or more indexes. The indexing engine further tracks whether there is cached resulting forecast data for each of the forecast models in the forecast model database. In some instances, further information about the cached resulting forecast data is maintained, such as but not limited to date the resulting forecasting data was generated, whether the resulting forecasting data is valid and/or has expired, one or more requestors to receive the data, other such information, or a combination of two or more of such data.

The forecasting interface system can, in some embodiments, include a forecast queue system 208 that queues up the requested forecasts. Typically, a request is queued when there is not resulting forecast data that is cached and not expired for the forecast model identified to be run. The queuing can be based on a first-in-first-out application. Additionally or alternatively, in the forecast queue system may identify and/or receive priority information corresponding to one or more of the forecast requests. Based on the priority, the forecast queue system can adjust the queue and add or move forecast requests based on a priority. The priority may be provided by the interface service system and/or determined by the forecast queue system based on an evaluation of one or more parameters and/or forecast request data (e.g., a rush indicator, an identifier of a requestor, an identification of the requestor computer system, other such information or combination of two or more of such information). Similarly, the scheduler system may identify a priority of a forecast request. The forecast queue system activates the relevant forecast through the forecast implementation system 212.

The forecast implementation system 212 accesses the forecast model database and causes the identified one or more forecast models to be run in accordance with the queue when relevant. The forecast models access the relevant information, including the forecast request data in setting parameters, limits, conditions and the like that are utilized while running the forecast model. The resulting forecast data is obtained and returned to the requestor through the interface service system 202 and the application interface system 120. As introduced above, in some embodiments, the forecasting interface system further directs the resulting forecast data, received in response to an activation of the selected forecast model, to be cached in the forecast results database 113 to be available in response to subsequent corresponding forecast requests.

In some embodiments, the forecasting interface system 102 further includes a resource allocation control circuit 210 can limit and/or allocate system resources in running the different forecast models. The resource allocation control circuit, in some applications, evaluates each of the received forecast requests for each forecast model that is to be run relative to resources of the forecasting interface system, and may limit the utilization of resources of the forecasting interface system in implementing one or more of the selected forecast models based on predicted and/or actual underutilization of resources at the time the selected forecast models are to run. As such, the resource allocation control circuit provides a throttling of the system resources to avoid a single forecast model, one or more requestors, and the like from utilizing an imbalanced quantity of the system resources. Typically, the forecast implementation system includes and/or accesses one or more processors, servers, computers and the like, which are often geographically distributed over the communication network 110, to run the one or more forecast models. However, a single requestor may submit numerous forecast requests, a single forecast model may attempt to utilize large quantities of resources, a large number of requests may be pending, or other such factors. As such, the resource allocation control circuit can control which resources are allocated to run which forecast model.

Some embodiments, the forecasting system 100 may further include a scheduler system 106 that communicates with at least the forecasting interface system, and in some instances the interface service system 202. The scheduler system, at least in part, maintains one or more schedules defining when each of a plurality of the numerous different forecast models are to be run without a specific request from a remote requestor. This allows the forecasting system to schedule forecast models to be run that are regularly requested and/or where updated information is regularly desired. The scheduler system 106 maintains and updates the schedule 230. The schedule can be time based (e.g., on Mondays and Thursdays, once a week, bi-monthly, daily, seasonally, etc.), based on receiving updated information (e.g., updated sales information, confirmation of a received shipment, change of weather, change of season, etc.). When a particular forecast model is scheduled to be activated can depend on many factors, such as but not limited to, how often a request is received corresponding to a forecast model, the relevance of the resulting forecast data, a rate of change to parameters that can affect resulting forecast data, a duration specified in the forecast request, other such factors, or combination of two or more of such factors. Based on the schedule, the scheduler system communicates instructions, through a create a forecast application 232, to the forecasting interface system 102 to activate each of the plurality of forecast models in accordance with the schedule. The resulting forecast data generated in response to the scheduled activation can be cached in the forecast results database 113 to be later available in response to a subsequent request. The scheduler system can maintain resulting forecast data current and available, which significantly reduces requestor wait times. Further, the scheduler system can schedule the activation of one or more of the scheduled forecast models at times when there are less demands on the system resources and/or when additional resources may be utilized that may be reserved for other applications.

The scheduler system can in some applications further be configured to track the date relevance of resulting forecast data and expire one or more cached resulting forecast data. As described above, in some instances, the resulting forecast data is relevant for limited durations of time. As such, the scheduler system can track the expiration dates. The scheduler system can identify when one or more of the cached forecast results has expired, and communicate an expiration notification, through an expire activation application 234, causing an update indicating that the at least one of the cached forecast results is expired. The expiration notification may be communicated to the forecast results database causing the corresponding resulting forecast data to be designated as expired, moved to a different database (e.g., expired forecast results database, history database, etc.), additional data be added to the resulting forecast data that identifies the data as expired and/or other such actions. Additionally or alternatively, the scheduler system can communicate the expiration notification to the indexing engine that updates one or more forecast model indexes to cause an update in the forecast model index to indicate the corresponding cached resulting forecast data has expired. In some applications the indexing can comprise parameters or keys that define where the cached forecast results are stored.

In response to a forecast request, the forecasting interface system (e.g., through the indexing engine 206) can further determine, for each of the received forecast requests and prior to activating an identified and selected forecast model, whether resulting forecast data is cached based on a previous run of the selected forecast model. When the resulting forecast data is cached, the cached resulting forecast data can be communicated to the requestor computer system as a response to the forecast request. This avoids having to run the forecast model when resulting forecast data is available and valid. Further, the use of the cached data saves system resources for use in at least running other forecast models. As introduced above, in some instances, cached resulting forecast data may expire or otherwise be invalid. Accordingly, in some applications the forecasting interface system in determining whether the resulting forecast data is cached further confirms that the cached resulting forecast data has not expired, and communicates the cached resulting forecast data when the cached resulting forecast data has not expired.

Figure 3:
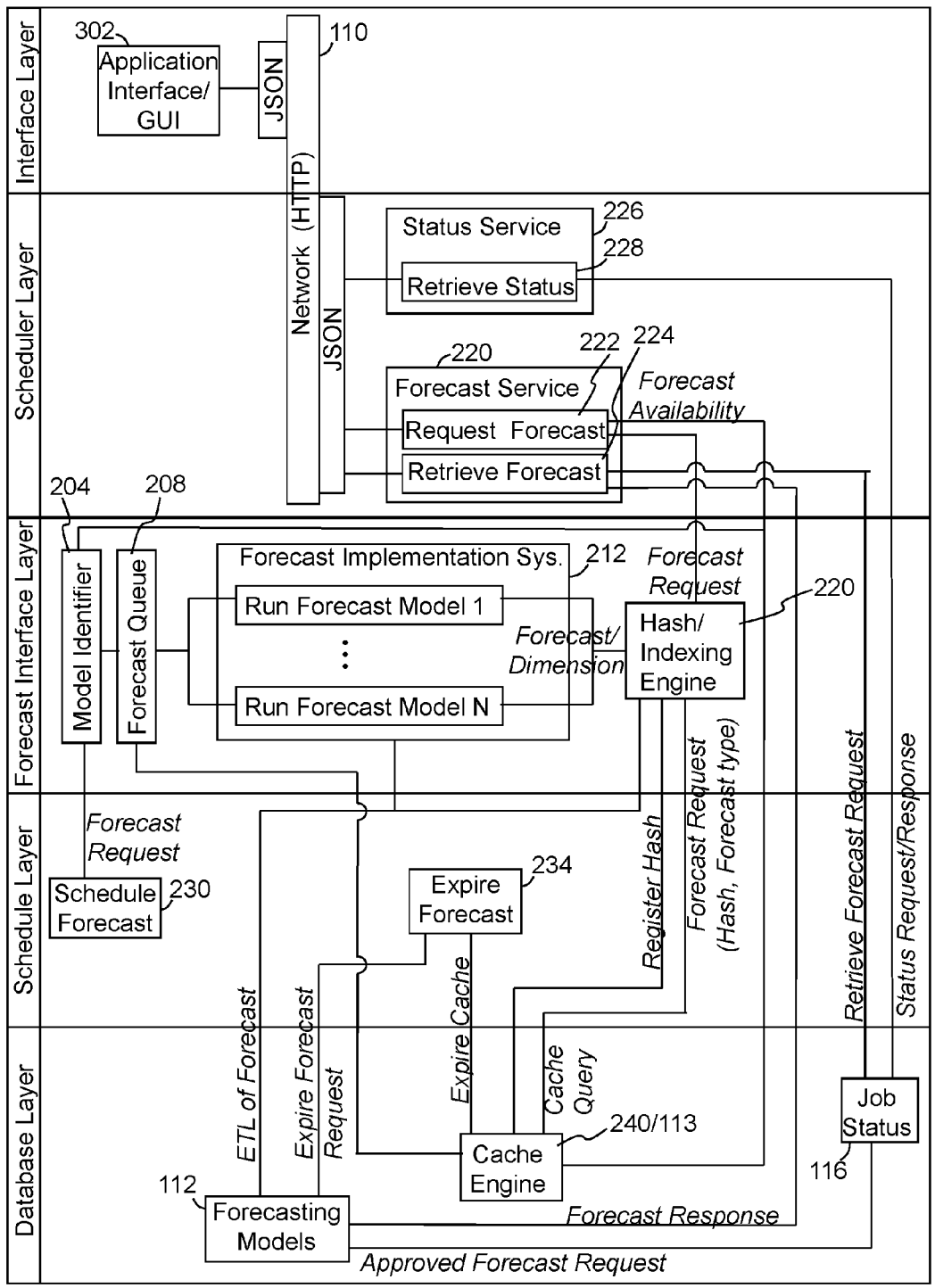
FIG. 3 illustrates a simplified component block diagram of an exemplary forecasting system, in accordance with some embodiments.

FIG. 3 illustrates a simplified component block diagram of an exemplary forecasting system 100, in accordance with some embodiments. The forecasting system utilizes the application interface system to establish a communication connection over the communication network 110 (e.g., HTTP protocol using JSON) to distribute the graphical user interfaces and/or data to cause the requestor computer systems to generate the graphical user interfaces 302, and receives the forecast request data (e.g., parameters or dimensions (e.g., what (products), where (shopping facility identifier), when (time frame), etc.), version, forecast type, etc.). A scheduler layer is provided that in some applications provides a communication interface between the application interface system and the forecasting interface system. The forecast service can include the request forecast application 222 that receives the forecast request data and generates a request to activate a forecast. The generated request can include the forecast request data, a forecast request identifier (e.g. job ID), forecast type information, and other such relevant information, which in some instances is communicated to the indexing engine 206. The forecast service application 220 may further activate a retrieve forecast application 224 in response to a notification that a forecast result is available (e.g., cached, after running a forecast model), and communicate the resulting forecast (e.g., specifying a forecast request identifier, and the forecast results). In some instances, the status service application 226 can further activate a retrieve status application 228 that can retrieve a status request, obtain status information (e.g., forecast request identifier, status information and/or identifier) and communicate the status information.

The forecasting interface system 102 provides a forecasting interface layer that includes the forecast model identifier system 204 receiving input from the scheduler system 106 and/or the forecast service application 220, and may help in selecting a forecast model. The request may include a forecast request identifier, forecast request data, forecast type, and/or other such information. Further, in some applications the forecast model identifier system may access additional information (e.g., additional forecast request data) from one or more sources. The forecast queue system 208 identifies an order of activation of forecast requests, which may be based on first-in-first-out, based on priority (which may be determined by the forecast queue system, the scheduler system, or the like), last-in-first-out, other such queuing and/or combination of such queuing. The forecast implementation system 212 activates the one or more forecast models as defined by the queue and scheduling. The forecast results, and in some instances, a forecast request identifier, some or all of the forecast request data, some or all of the additional forecast request data, other such information, or combination of two or more of such information is communicated to the indexing engine 206. In some applications the indexing engine applies one or more hash algorithms and indexes the forecast results and/or other data (e.g., one or more of the forecast request data, one or more of the additional forecast request data, etc.). The forecast model index is updated at the cache engine 240 and/or the forecast results can be cached in the forecast results database.

In some embodiments, the forecasting system enables wide access to forecasting using a forecast model database 112 that maintains numerous different forecast models that when run produce resulting forecast data relevant to making business decisions, such as retail forecast models providing resulting forecast data used in making business decision in operating at least one retail shopping facility (e.g., feature placement, products to be featured, predict desired quantities of cache to make change, etc.). A forecasting interface system 102 includes and/or communicatively couples with the forecast model database 112 and is configured to receive, over a distributed communication network from a plurality of different and geographically distributed requestor computer systems 104, multiple different retail forecast requests for forecast request data. In some implementations, the forecasting interface system includes a forecast model index that includes identifiers of the numerous different predefined retail forecast models and for each of the numerous different retail forecast models relevance characteristics. The forecasting interface system can select, for each received retail forecast request, a retail forecast model of the numerous different retail forecast models based on a relationship between the corresponding forecast request data and the relevance characteristics.

Figure 4:
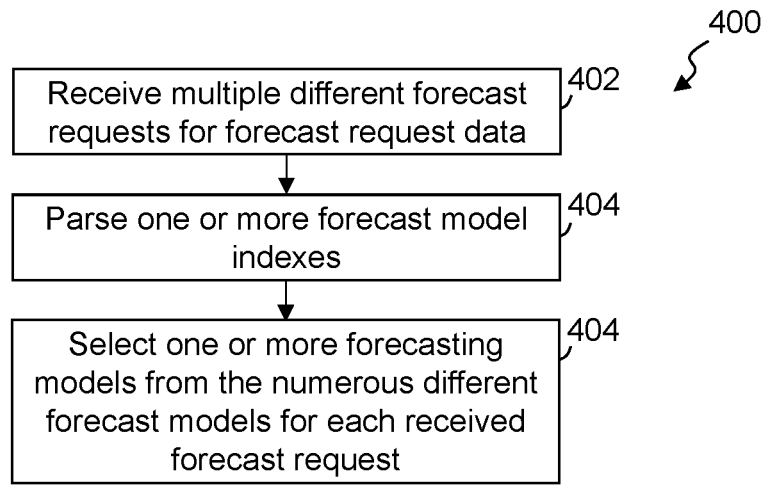
FIG. 4 illustrates a simplified flow diagram of an exemplary process of enabling wide access to forecasting, in accordance with some embodiments.

FIG. 4 illustrates a simplified flow diagram of an exemplary process 400 of enabling wide access to forecasting, in accordance with some embodiments. In step 402, multiple different forecast requests for forecast request data are received at a forecasting interface system 102 from each of multiple of different and geographically distributed requestor computer systems 104. Each forecast request includes forecast request data that is provided by the requestor. In some applications, a graphical user interface is displayed to the requestor with predefined fields where the requestor can enter and/or select parameters that define the forecast request data.

In step 404, one or more forecast model indexes are parsed, searched and/or evaluated. The model index includes identifiers of numerous different predefined forecast models maintained in a forecast model database 112, and for each of the numerous different forecast models corresponding relevance characteristics. In step 406, one or more forecast models are selected from the numerous different forecast models for each received forecast request. Typically, the forecast model is selected, at least in part, based on a relationship between corresponding forecast request data and relevance characteristics.

Some embodiments further determine, for each of the received forecast requests and prior to activating the selected forecast model, whether resulting forecast data is cached from a previous run of the selected forecast model. When the resulting forecast data is cached, the cached resulting forecast data is communicated in response to the forecast request. In some applications, an application interface system 120 distributes the resulting forecast data can causes a requestor computer system to display the resulting forecast data through a graphical user interface in one or more formats, which may depend on the requestor computer system, predefined parameters, requestor specified preference parameters, other such factors, or combination of two or more of such factors. In at least some instances, in determining whether the resulting forecast data is cached, some embodiments further confirm that the cached resulting forecast data has not expired. When the cached resulting forecast data has not expired, the cached resulting forecast data is communicated instead of causing the selected forecast model to be run.

Further, some embodiments identify, through a scheduler system 106, when at least one of a plurality of cached forecast results, generated in response to previous runs of a plurality of the forecast models, has expired. When it is determined that forecast results has expired, an expiration notification is communicated causing an update indicating that at least one of the cached forecast results is expired. In some instances, the notification can be received by the index engine 206, and the index engine can update the forecast model index to indicate that the cached forecast result, and the resulting forecast data of that forecast result, as expired. IN some instances, the forecast model index maintains a unique identifier for each cached forecast result, and a corresponding field, flag, bit or the like can indicate whether that forecast result has expired. Alternatively or additionally, the forecast result can be deleted from the forecast model index until a subsequent run of the corresponding forecast model generates updated forecast results that are current, valid and not expired.

In some embodiments, the scheduler system 106 may identify when at least one of a plurality of cached forecast results, generated in response to previous runs of a plurality of the forecast models, has expired. In the event that a cached forecast result has expired, the scheduling system may cause an expiration notification to be communicated that causes an update indicating that the at least one of the cached forecast results is expired. This update may be implemented at a forecast results database 113, the forecast model index, or the like. The scheduler system may further maintain at least one schedule defining when one or more, and typically a plurality of the numerous different forecast models are to be run without a specific request from a remote requestor. An instruction can be communicated to the forecasting interface system 102 to activate each of the plurality of forecast models in accordance with the schedule and cache the resulting forecast data in the forecast results database to be later available in response to a subsequent request.

In some applications, the selection of one or more forecast models includes retrieving additional forecast request data. As introduced above, often the additional forecast request data corresponds to the requestor supplied forecast request data and/or is determined based on one or more parameters of the forecast request data. For example, in some implementations, additional forecast request data is retrieved (e.g., from a database) based on an identifier of a retail shopping facility received as at least part of the forecast request data. Using the forecast request data and the additional forecast request data, a forecast model can be selected between different valid and active versions of the selected forecast model based on the relevance characteristics corresponding to each of the different versions of the forecast model and the corresponding forecast request data and the additional forecast request data. For example, the retrieval of the additional forecast request data can include retrieving historical sales volume data, relative facility size, quantity of products offered for sale, salary ranges, number of employees, size and/or number of products in a department, other such additional forecast request data or combination of two or more of such additional forecast request data corresponding to an identifier of a retail shopping facility specified in the forecast request data.

Some embodiments further apply a throttling of the allocation of system resources in running one or more forecast models. An evaluation can be performed for each of the received forecast requests relative to resources of the forecasting interface system, and limitations can be applied to the utilization of resources of the forecasting interface system in implementing one or more of the selected forecast models based on unutilized resources and/or utilized resources at the time the one or more selected forecast models are to run. Further, some embodiments determine whether forecast results for a selected forecast model have been cached prior to initiating a run of a selected forecast mode. This can further save resources for use in running other forecast models. Accordingly, when a forecast model is run the forecast results may be cache. Some embodiments direct the resulting forecast data received in response to an activation of the selected forecast model to be cached in a forecast results database 113 to be available in response to a subsequent corresponding forecast request. Typically, the cached forecast results are associated with the forecast model, and other information may be maintained. For example, the indexing engine may receive relevant information and the forecast model index can be updated. In some embodiments, the indexing engine further includes a hashing engine and/or implements hashing in generating the indexing of the forecast results relative to the identification of the corresponding forecast model. The indexing may further associate one or more forecast request parameters with an identifier of the forecast model and/or the hashed forecast result.

In response to the forecast request, the forecasting system can provide access to previously generated and cached forecast results, or activate one or more forecast models and provide access to the forecast results. The forecasting system can include the application interface system 120 that couples with a distributed communication network 110 and distributes interface data to each of multiple requestor computer systems of numerous remote requestor computer systems coupled with the distributed communication network, causing the multiple requestor computer systems to display a user interface that enables the remote requestors to enter defined types of the forecast request data that are used by the forecasting system in identifying one or more relevant forecast models to activate. In some embodiments, the application interface system further distributes interface data that includes the resulting forecast data to be displayed at one or more requestor computer systems. Further, the resulting forecast data may be presented in a predefined format as defined by a user interface and/or display instructions issued by the application interface system.

Figure 5:
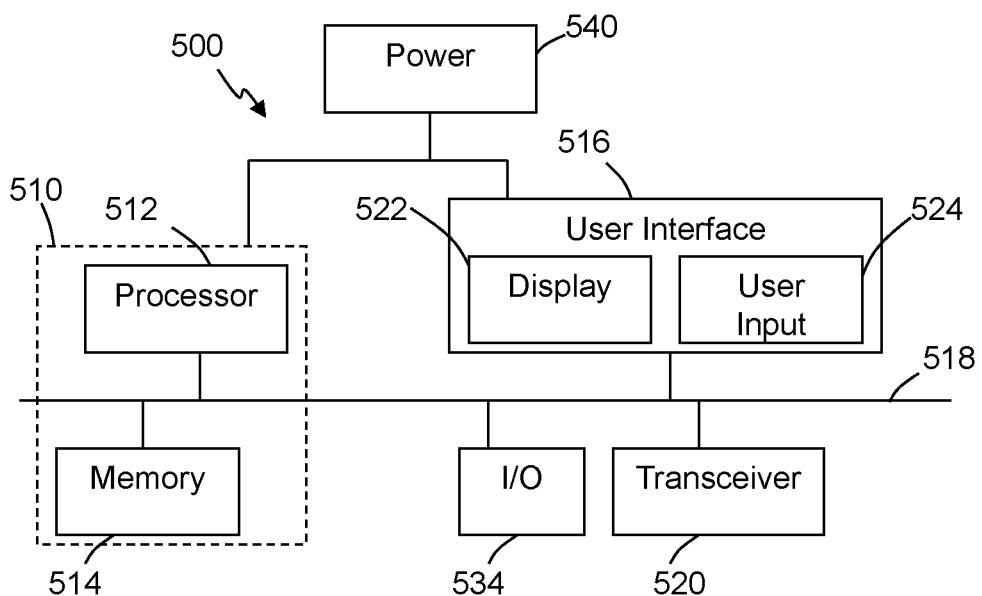
FIG. 5 illustrates an exemplary system for use in implementing methods, techniques, devices, apparatuses, systems, servers, sources and the like in loading and/or unloading products in accordance with some embodiments.

Further, the processes, methods, techniques, circuits, circuitry, systems, devices, functionality, services, servers, sources and the like described herein may be utilized, implemented and/or run on many different types of devices and/or systems. Referring to FIG. 5, there is illustrated an exemplary system 500 that may be used for any such implementations, in accordance with some embodiments. One or more components of the system 500 may be used for implementing any circuitry, system, functionality, apparatus, process, or device mentioned above or below, or parts of such circuitry, functionality, systems, apparatuses, processes, or devices, such as for example any of the above or below mentioned forecasting interface system 102, requestor computer system 104, scheduler system 106, interface service system 108, application interface system 120, interface service system 202, indexing engine 206, and/or other such circuitry, functionality and/or devices. However, the use of the system 500 or any portion thereof is certainly not required.

By way of example, the system 500 may comprise a controller circuit or processor module 512, memory 514, and one or more communication links, paths, buses or the like 518. Some embodiments may include a user interface 516, and/or a power source or supply 540. The controller circuit 512 can be implemented through one or more processors, microprocessors, central processing units, logic, local digital storage, firmware, software, and/or other control hardware and/or software, and may be used to execute or assist in executing the steps of the processes, methods, functionality and techniques described herein, and control various communications, programs, content, listings, services, etc. Further, in some embodiments, the controller circuit 512 can be part of control circuitry and/or a control system 510, which may be implemented through one or more processors with access to one or more memory 514. In some applications, the controller circuit 512, memory and/or other components of the system 500 may be implemented through multiple components distributed across a distributed communication network 110. For example, some or all of the controller circuit 512 may be implemented through multiple servers that cooperatively and/or duplicatively operate to provide the functionality of the system. The user interface 516 can allow a user to interact with the system 500 and receive information through the system. In some instances, the user interface 516 includes a display 522 and/or one or more user inputs 524, such as a buttons, touch screen, track ball, keyboard, mouse, etc., which can be part of or wired or wirelessly coupled with the system 500.

Typically, the system 500 further includes one or more communication interfaces, ports, transceivers 520 and the like allowing the system 500 to communication over a communication bus, a distributed communication network 110 (e.g., a local network, the Internet, WAN, etc.), communication link 518, other networks or communication channels with other devices and/or other such communications or combinations thereof. Further the transceiver 520 can be configured for wired, wireless, optical, fiber optical cable or other such communication configurations or combinations of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports.

The system 500 comprises an example of a control and/or processor-based system with the controller circuit 512. Again, the controller circuit 512 can be implemented through one or more processors, controllers, central processing units, logic, software and the like. Further, in some implementations the controller circuit 512 may provide multiprocessor functionality.

The memory 514, which can be accessed by the controller 512, typically includes one or more processor readable and/or computer readable media accessed by at least the controller circuit 512, and can include volatile and/or nonvolatile media, such as RAM, ROM, EEPROM, flash memory and/or other memory technology. Further, the memory 514 is shown as internal to the system 510; however, the memory 514 can be internal, external or a combination of internal and external memory. Similarly, some or all of the memory 514 can be internal, external or a combination of internal and external memory of the controller circuit 512. The external memory can be substantially any relevant memory such as, but not limited to, one or more of flash memory secure digital (SD) card, universal serial bus (USB) stick or drive, other memory cards, hard drive and other such memory or combinations of such memory. The memory 514 can store code, software, executables, scripts, data, content, lists, programming, programs, log or history data, user information and the like.

In some embodiments, systems, apparatuses and methods are provided to enable access to forecasting models. Some embodiments comprise systems to enable wide access to retail forecasting, comprising: a forecast model database that maintains numerous different retail forecast models that when run produce resulting forecast data relevant to making business decisions in operating at least one retail shopping facility; and a forecasting interface system communicatively coupled with the forecast model database and configured to receive, over a distributed communication network from a plurality of different and geographically distributed requestor computer systems, multiple different retail forecast requests for forecast request data, wherein the forecasting interface system comprises a forecast model index comprising identifiers of the numerous different predefined retail forecast models and for each of the numerous different retail forecast models relevance characteristics, wherein the forecasting interface system selects, for each received retail forecast request, a retail forecast model of the numerous different retail forecast models based on a relationship between the corresponding forecast request data and the relevance characteristics.

Further, some embodiments provide methods of enable wide access to retail forecasting, comprising: receiving, at a forecasting interface system from each of multiple of different and geographically distributed requestor computer systems, multiple different retail forecast requests for forecast request data, wherein each of the retail forecast requests comprises forecast request data; parsing a forecast model index comprising identifiers of numerous different predefined retail forecast models maintained in a forecast model database, and for each of the numerous different retail forecast models relevance characteristics; and selecting, for each received retail forecast request, a retail forecast model of the numerous different retail forecast models based on a relationship between corresponding forecast request data and relevance characteristics.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to enable wide access to retail forecasting, comprising:
   a forecast model database, implemented through multiple different physical memory components distributed over and communicatively coupled with a distributed communication network, wherein the forecast model database maintains numerous different retail forecast models that when run produce resulting forecast data relevant to making business decisions in operating at least one retail shopping facility, and further maintains, for each of a subset of one or more of the retail forecast models, multiple different versions of the respective retail forecast model of the subset of retail forecast models, wherein the different versions of a retail forecast model are configured to generate similar resulting forecast data while being more relevant to variations on similar forecast request data;
   a forecasting interface system comprising multiple computer systems, distributed over the communication network, that cooperatively and duplicatively operate to provide wide access and further communicatively coupled with the forecast model database, wherein the forecasting interface system is configured to receive, over the distributed communication network from a plurality of different and geographically distributed requestor computer systems, multiple different retail forecast requests for forecast request data, wherein the forecasting interface system comprises a forecast model index comprising identifiers of the numerous different predefined retail forecast models and for each of the numerous different retail forecast models relevance characteristics, wherein the forecasting interface system selects, for each received retail forecast request, a retail forecast model of the numerous different retail forecast models based on a relationship between the corresponding forecast request data and the relevance characteristics;
   wherein the forecasting interface system in selecting a selected first retail forecast model corresponding to a first retail forecast request further fine-tunes a resulting first forecasted data by further retrieving additional forecast request data based on an identifier of a retail shopping facility corresponding to the first retail forecast request obtained as at least part of the forecast request data, and selecting between different valid and active versions of the selected first retail forecast model based on relevance characteristics corresponding to each of the different versions of the selected retail forecast model and the corresponding forecast request data and the additional forecast request data;
   wherein the additional forecast request data comprises a first relevance characteristic data and a first version of the selected first retail forecast model is selected when the request corresponds to a first quantity of the first relevance characteristic; a second version of the selected first retail forecast model corresponds to when the request corresponds to a second quantity of the characteristics data for the first relevance characteristic that is less than the first quantity; a third version of the selected first retail forecast model corresponds to when the request corresponds to a third quantity of the characteristic data for the first relevance characteristic that is less than the second quantity;
   wherein the forecasting interface system is further configured to determine, for each of the received retail forecast requests and prior to activating a corresponding selected retail forecast model selected for a corresponding one of the retail forecast requests, whether resulting forecast data is cached from a previous run of the selected retail forecast model; evaluate the cached resulting forecast data relative to an expiration threshold corresponding to the selected retail forecast model; confirm that the cached resulting forecast data has not expired relative to the expiration threshold, and when the resulting forecast data is cached and has not expired communicates the cached resulting forecast data over the distributed communication network in response to the retail forecast request without running the corresponding selected retail forecast model;
   an indexing engine communicatively coupled with the forecasting interface system, wherein the indexing engine maintains the forecast model index;
   wherein the forecasting interface system is further configured to determine that the resulting forecast data is to be cached, and cause the forecast model index to be updated, wherein the forecast model index comprises identifiers for each of the numerous forecast models and for each of the numerous of forecast models the corresponding relevance characteristics, and further includes, for each of the numerous forecast models that have cached resulting forecast data, caching information comprising date generated, whether expired, and requestors that received the data, and wherein the indexing engine further applies a hash algorithm to respective resulting forecast data.

2. The system of claim 1, further comprising:
   a forecast results database caching a plurality of multiple forecast results generated in response to previous runs of a plurality of the retail forecast models; and
   a scheduler system communicatively coupled with the forecast results database, wherein the scheduler system is configured to identify when at least one of the cached forecast results has expired, and communicates an expiration notification causing an update indicating that the at least one of the cached forecast results is expired and scheduling, without a request from a requestor, an activation of a corresponding at least one retail forecast model of the plurality of retail forecast models to update the forecast results corresponding to the at least one retail forecast model.

3. The system of claim 1, further comprising:
   a forecast results database communicatively coupled with the forecasting interface system; and
   a scheduler system communicatively coupled with the forecasting interface system and configured to maintain at least one schedule defining when a plurality of the numerous different retail forecast models are to be run without a specific request from a remote requestor, and communicate an instruction to the forecasting interface system to activate each of the plurality of retail forecast models in accordance with the at least one schedule and cache the resulting forecast data in the forecast results database to be later available in response to a subsequent request.

4. The system of claim 1, wherein the forecasting interface system in retrieving the additional forecast request data further retrieves historical sales volume data and relative facility size corresponding to the identifier of the retail shopping facility.

5. The system of claim 1, wherein the forecasting interface system comprises a resource allocation control circuit configured to evaluate each of the received retail forecast requests relative to resources of the forecasting interface system to limit the utilization of resources of the forecasting interface system in implementing at least one of the selected retail forecast models based on unutilized resources at the time the at least one of the selected retail forecast models is to run.

6. The system of claim 1, wherein the forecasting interface system is further configured to direct the resulting forecast data, received in response to an activation of the selected forecast model, to be cached in a forecast results database to be available in response to a subsequent corresponding retail forecast request.

7. The system of claim 1, further comprising:
an application interface system coupled with the distributed communication network and configured to distribute user interface data to each of the multiple requestor computer systems causing the multiple requestor computer systems to display a user interface that enables the remote requestors to enter defined types of the forecast request data.

8. A method of enable wide access to retail forecasting, comprising:
maintaining, in a forecast model database implemented through multiple different physical memory components distributed over and communicatively coupled with a distributed communication network, numerous different retail forecast models that when run produce resulting forecast data relevant to making business decisions in operating at least one retail shopping facility;
maintaining for each of a subset of one or more of the retail forecast models multiple different versions of the respective retail forecast model of the subset of retail forecast models, wherein the different versions of a retail forecast model are configured to generate similar resulting forecast data while being more relevant to variations on similar forecast request data;
receiving, from each of multiple of different requestor computer systems that are geographically distributed over the distributed communication network, multiple different retail forecast requests for forecast request data at a forecasting interface system comprising multiple computer systems, distributed over the communication network, that cooperatively and duplicatively operate to provide wide access and further communicatively coupled with the forecast model database, wherein each of the retail forecast requests comprises forecast request data;
parsing a forecast model index comprising identifiers of numerous different predefined retail forecast models maintained in the forecast model database, and for each of the numerous different retail forecast models relevance characteristics;
selecting, for each received retail forecast request, a retail forecast model of the numerous different retail forecast models based on a relationship between corresponding forecast request data and relevance characteristics;
wherein the selecting the retail forecast model comprises selecting a selected first retail forecast model corresponding to a first retail forecast request; fine-tuning a resulting first forecasted data by further retrieving additional forecast request data based on an identifier of a retail shopping facility corresponding to the first retail forecast request obtained as at least part of the forecast request data; and selecting between different valid and active versions of the selected first retail forecast model based on relevance characteristics corresponding to each of the different versions of the selected retail forecast model and the corresponding forecast request data and the additional forecast request data;
wherein the selecting between the different versions of the selected first retail forecast model comprises selecting: a first version of the selected first retail forecast model when the request corresponds to a first quantity of a first relevance characteristic; a second version of the selected first retail forecast model corresponds to when the request corresponds to a second quantity of the characteristics data for the first relevance characteristic that is less than the first quantity, and a third version of the selected first retail forecast model corresponds to when the request corresponds to a third quantity of the characteristic data for the first relevance characteristic that is less than the second quantity;
determining, for each of the received retail forecast requests and prior to activating a corresponding selected retail forecast model selected for a corresponding one of the retail forecast requests, whether resulting forecast data is cached from a previous run of the selected retail forecast model, evaluating the cached resulting forecast data relative to an expiration threshold corresponding to the selected retail forecast model; confirming that the cached resulting forecast data has not expired relative to the expiration threshold; and communicating, when the resulting forecast data is cached and has not expired, the cached resulting forecast data over the distributed communication network in response to the retail forecast request without running the corresponding selected retail forecast model;
maintaining, by an indexing engine communicatively coupled with the forecasting interface system, the forecast model index;
wherein the forecasting interface system is further configured to determining that the resulting forecast data is to be cached and causing the forecast model index to be updated, wherein the forecast model index comprises identifiers for each of the numerous forecast models and for each of the numerous of forecast models the corresponding relevance characteristics, and further includes, for each of the numerous forecast models that have cached resulting forecast data, caching information comprising date generated, whether expired, and requestors that received the data;
applying, by the indexing engine, a hash algorithm to respective resulting forecast data.

9. The method of claim 8, further comprising:
identifying, through a scheduler system, when at least one of a plurality of cached forecast results, generated in response to previous runs of a plurality of the retail forecast models, has expired; and
communicating an expiration notification causing an update indicating that the at least one of the cached forecast results is expired and scheduling, without a request from a requestor, an activation of a corresponding at least one retail forecast model of the plurality of retail forecast models to update the forecast results corresponding to the at least one retail forecast model.

10. The method of claim 8, further comprising:
maintaining, through a scheduler system, at least one schedule defining when a plurality of the numerous different retail forecast models are to be run without a specific request from a remote requestor; and
communicating an instruction to the forecasting interface system to activate each of the plurality of retail forecast models in accordance with the at least one schedule and cache the resulting forecast data in the forecast results database to be later available in response to a subsequent request.

11. The method of claim 8, wherein the retrieving the additional forecast request data further comprises retrieving historical sales volume data and relative facility size corresponding to the identifier of the retail shopping facility.

12. The method of claim 8, further comprising:
evaluating each of the received retail forecast requests relative to resources of the forecasting interface system and limiting the utilization of resources of the forecasting interface system in implementing at least one of the selected retail forecast models based on unutilized resources at the time the at least one of the selected retail forecast models is to run.

13. The method of claim 8, further comprising:
directing the resulting forecast data received in response to an activation of the selected forecast model to be cached in a forecast results database to be available in response to a subsequent corresponding retail forecast request.

14. The method of claim 8, further comprising:
distributing interface data, through an application interface system coupled with the distributed communication network, to each of the multiple requestor computer systems of numerous remote requestor computer systems coupled with the distributed communication network, and causing the multiple requestor computer systems to display a user interface that enables the remote requestors to enter defined types of the forecast request data.

* * * * *

UNITED STATES PATENT AND TRADEMARK OFFICE
CERTIFICATE OF CORRECTION

PATENT NO. : 10,489,803 B2
APPLICATION NO. : 15/411521
DATED : November 26, 2019
INVENTOR(S) : Christopher M. Johnson et al.

Page 1 of 1

It is certified that error appears in the above-identified patent and that said Letters Patent is hereby corrected as shown below:

In the Claims

Column 18, Line 24, delete "quantity," and insert --quantity;--.
Column 18, Line 34, delete "model," and insert --model;--.

Signed and Sealed this
Thirty-first Day of March, 2020

Andrei Iancu
*Director of the United States Patent and Trademark Office*